United States Patent
Woo et al.

(10) Patent No.: US 12,200,486 B2
(45) Date of Patent: Jan. 14, 2025

(54) SERVICE IDENTIFYING AND PROCESSING METHOD USING LOW DISTANCE WIRELESS TERMINAL MESSAGE

(71) Applicant: ESTORM CO., LTD., Seoul (KR)

(72) Inventors: Jong Hyun Woo, Seoul (KR); Tae Il Lee, Uiwang-si (KR); Il Jin Jung, Siheung-si (KR); Hee Jun Shin, Seoul (KR); Hyung Seok Jang, Seoul (KR); Min Jae Son, Seoul (KR); Sang Heon Baek, Incheon (KR); Seo Bin Park, Hwaseong-si (KR); Hyo Sang Kwon, Bucheon-si (KR); Mi Ju Kim, Seoul (KR); Jung Hoon Song, Gunpo-si (KR); Rakhmanov Dilshod, Seoul (KR); Dong Hee Kim, Anyang-si (KR); Jeon Gjin Kim, Gimpo-si (KR)

(73) Assignee: ESTORM CO., LTD., Seoul (KR)

( * ) Notice: Subject to any disclaimer, the term of this patent is extended or adjusted under 35 U.S.C. 154(b) by 0 days.

(21) Appl. No.: 17/622,933

(22) PCT Filed: Dec. 23, 2021

(86) PCT No.: PCT/KR2021/019731
§ 371 (c)(1),
(2) Date: Dec. 27, 2021

(87) PCT Pub. No.: WO2023/120774
PCT Pub. Date: Jun. 29, 2023

(65) Prior Publication Data
US 2024/0129725 A1    Apr. 18, 2024

(51) Int. Cl.
| H04W 12/06 | (2021.01) |
| H04W 4/20 | (2018.01) |
| H04W 12/08 | (2021.01) |
| H04W 12/12 | (2021.01) |
| H04W 12/30 | (2021.01) |
| H04W 88/02 | (2009.01) |

(52) U.S. Cl.
CPC ............ *H04W 12/06* (2013.01); *H04W 4/20* (2013.01); *H04W 12/30* (2021.01)

(58) Field of Classification Search
CPC ........ H04W 12/06; H04W 12/30; H04W 4/20
See application file for complete search history.

(56) References Cited

U.S. PATENT DOCUMENTS

| 10,251,018 B1* | 4/2019 | Susel ................... G06N 20/00 |
| 2017/0083889 A1* | 3/2017 | Kwak .................. G06Q 20/322 |
| 2017/0181063 A1* | 6/2017 | Kim ...................... H04W 48/18 |
| 2017/0223537 A1* | 8/2017 | Lee ...................... H04L 63/0876 |
| 2018/0121921 A1* | 5/2018 | Woo ...................... H04W 12/06 |

* cited by examiner

*Primary Examiner* — Moustapha Diaby
(74) *Attorney, Agent, or Firm* — PnK IP LLC

(57) ABSTRACT

A service identifying and processing method using a wireless terminal message according to an exemplary embodiment of the present invention includes (a) receiving a wireless terminal message by a first entity which is a mobile device; and (b) expressing, by a first agent which is an information processing application program installed on the first entity, entity information of second entity based on the wireless terminal message and service confirmation information related to service provided by the second entity, through an application screen by the first agent.

10 Claims, 8 Drawing Sheets

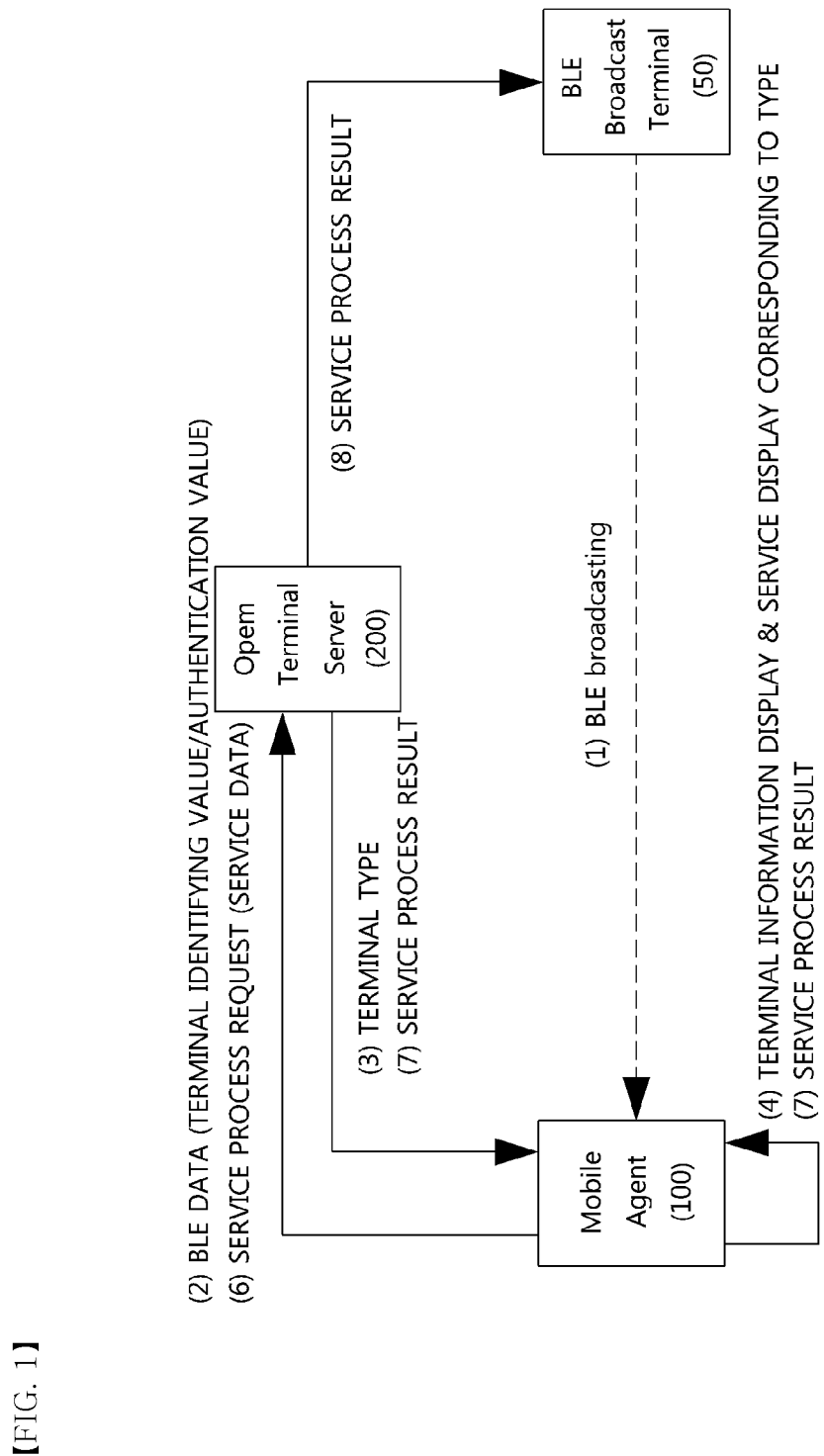
[FIG. 1]

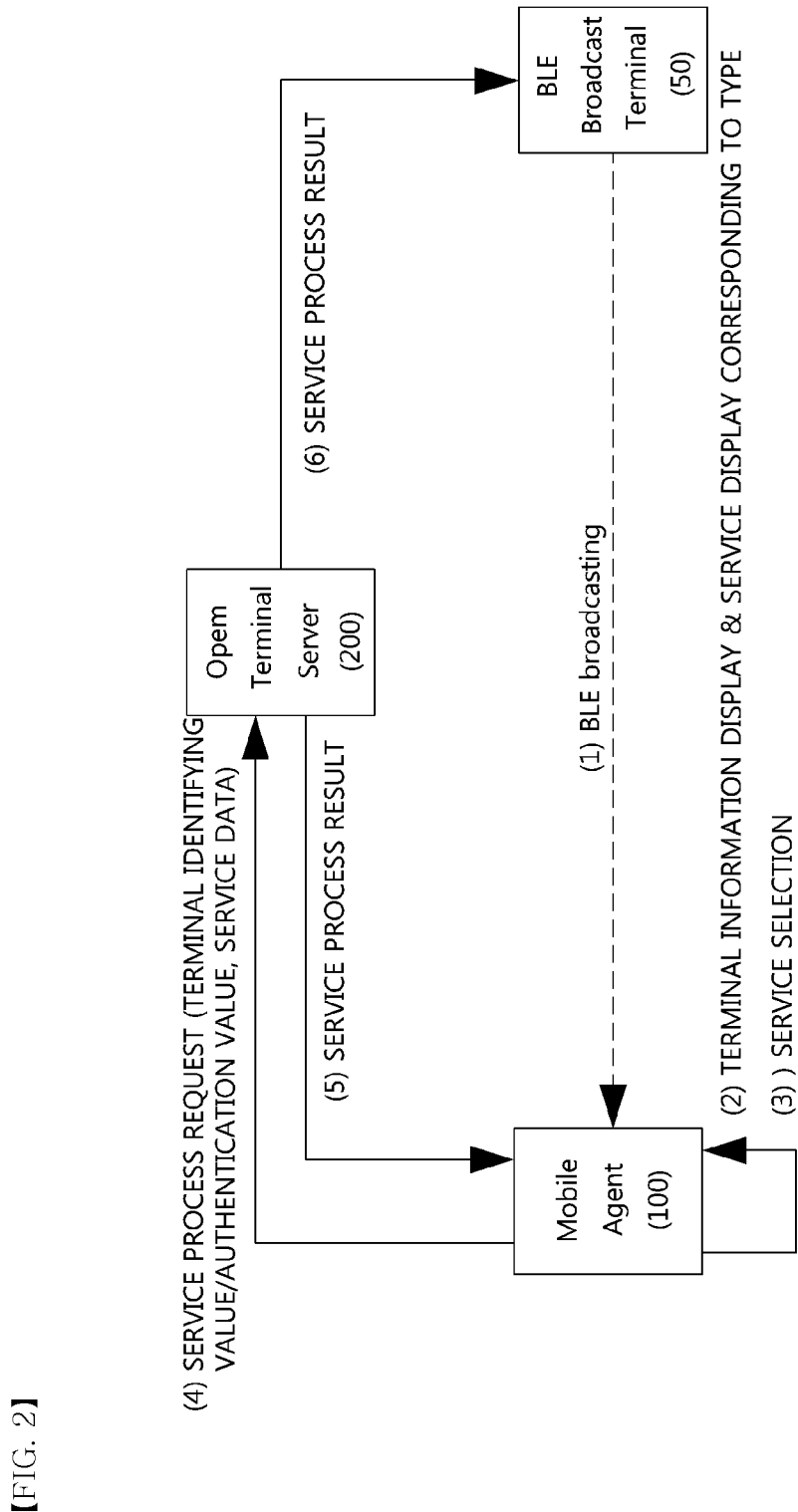

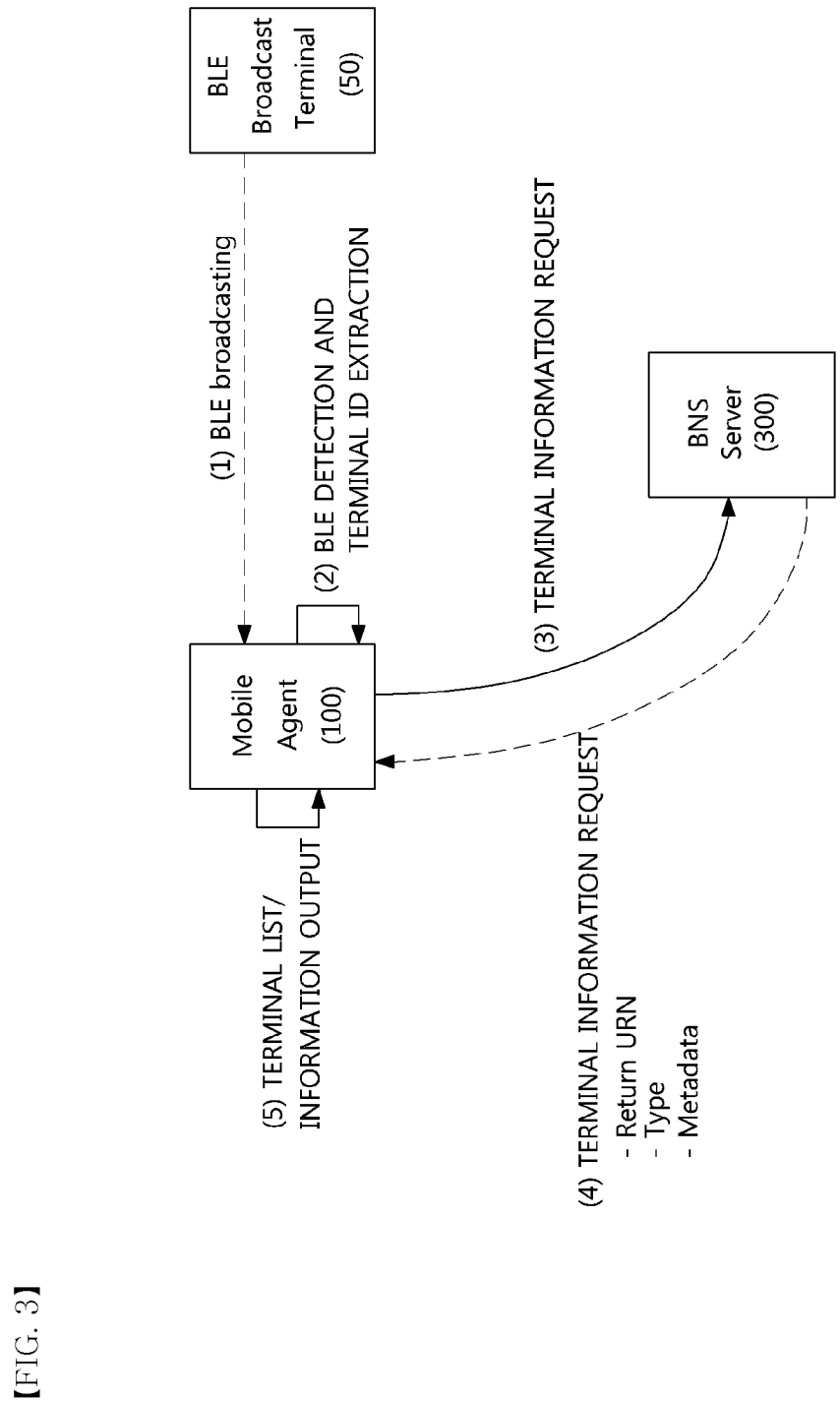
[FIG. 3]

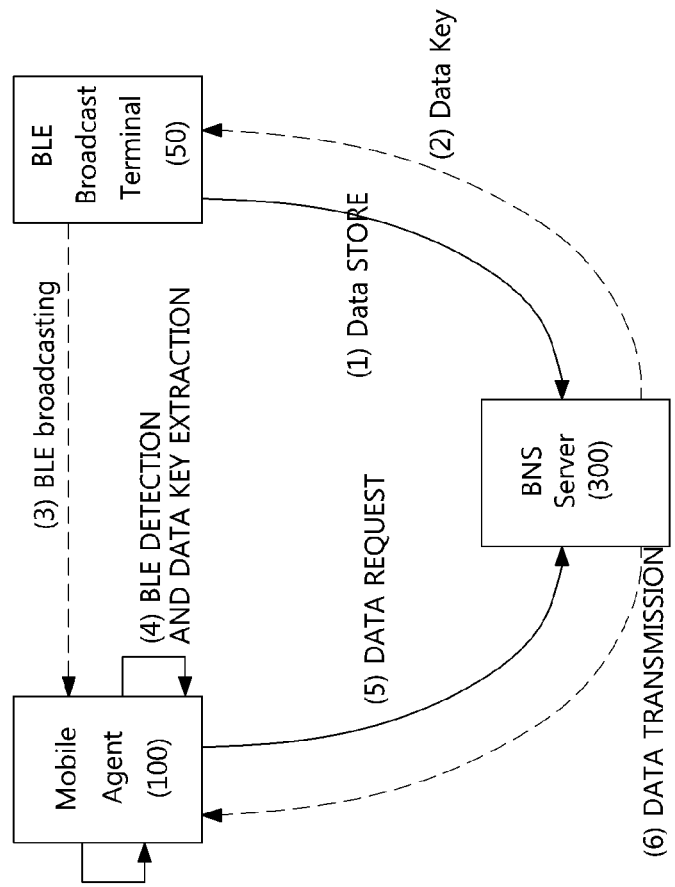
[FIG. 4]

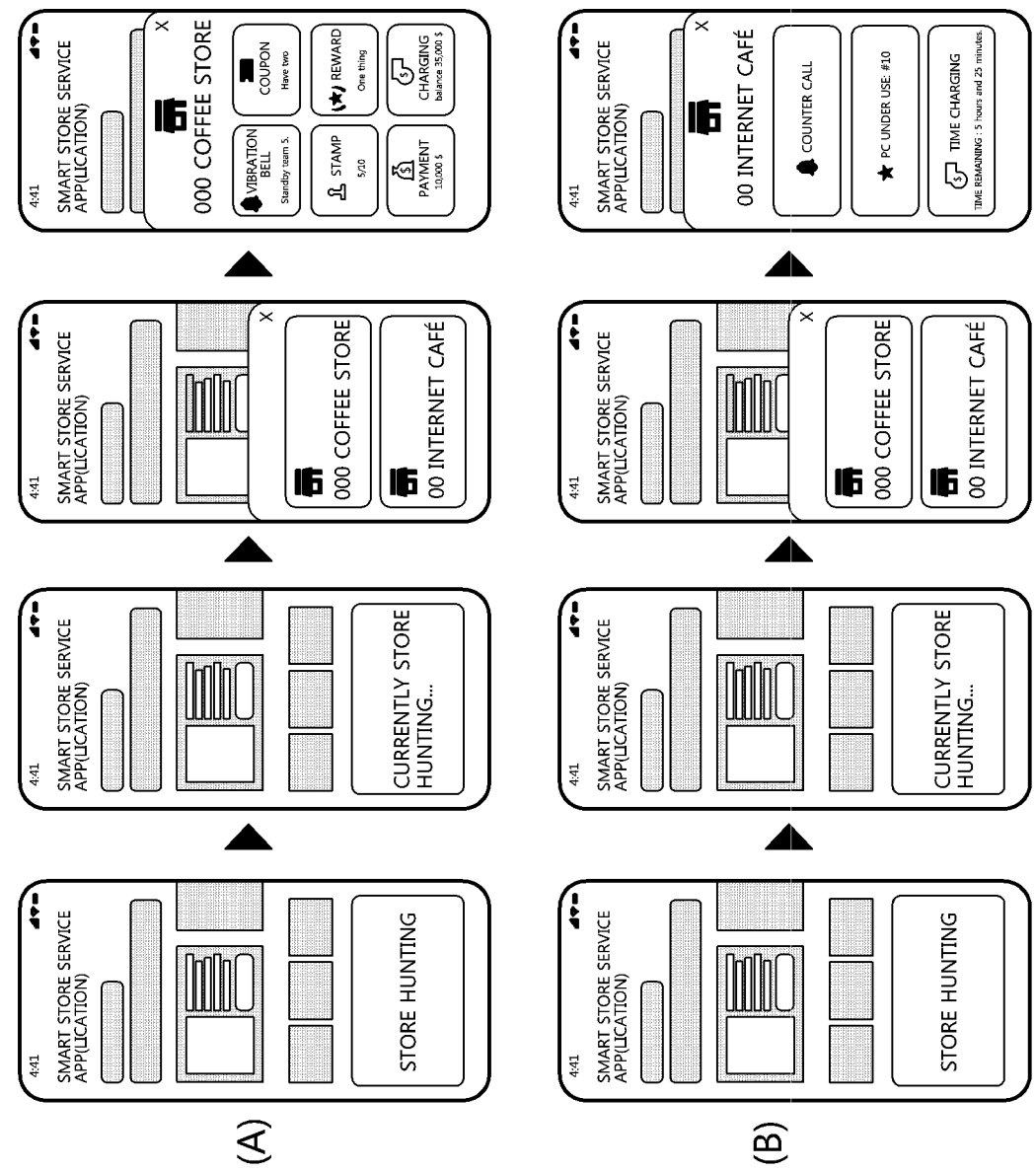
[FIG. 5]

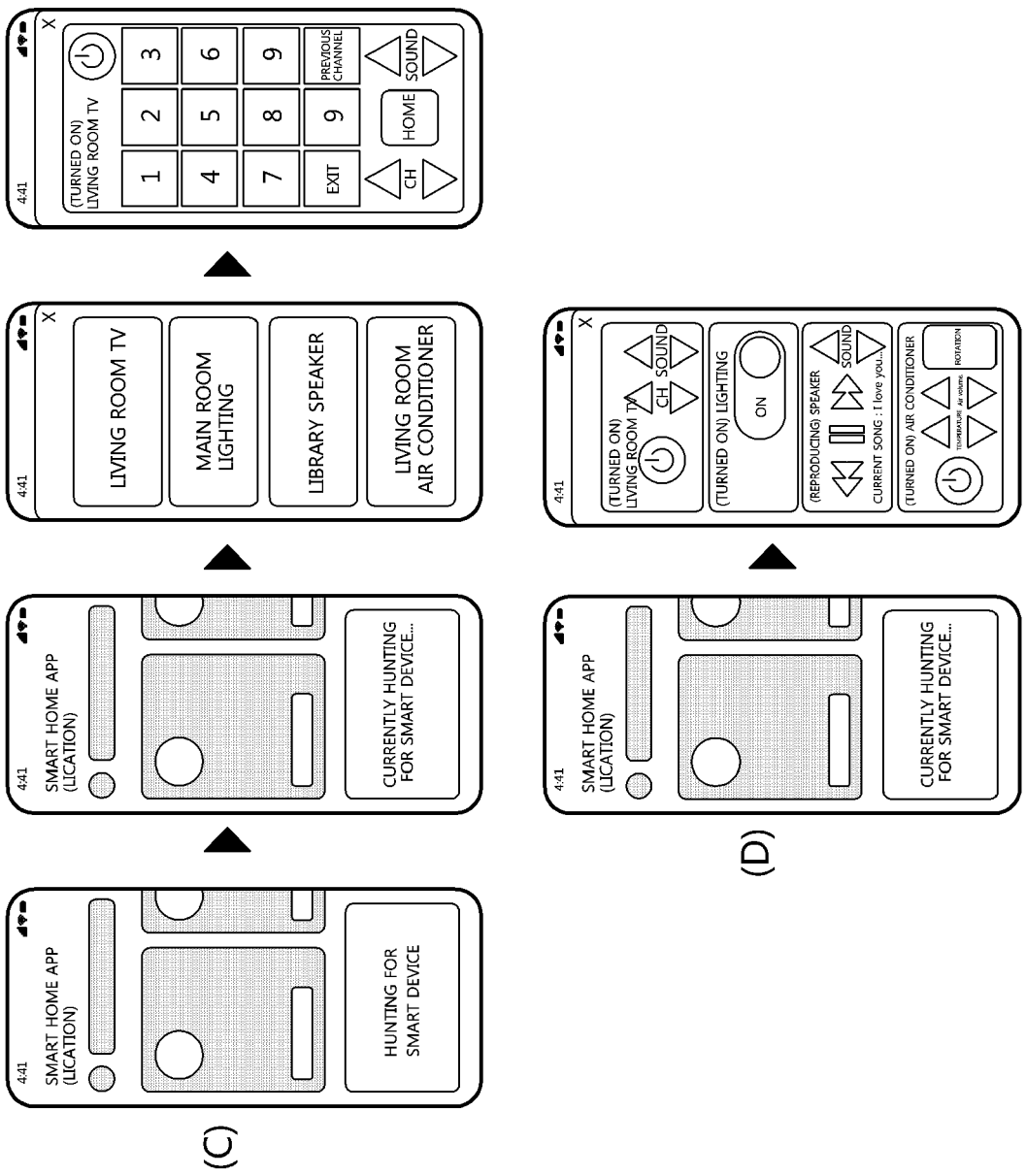
[FIG. 6]

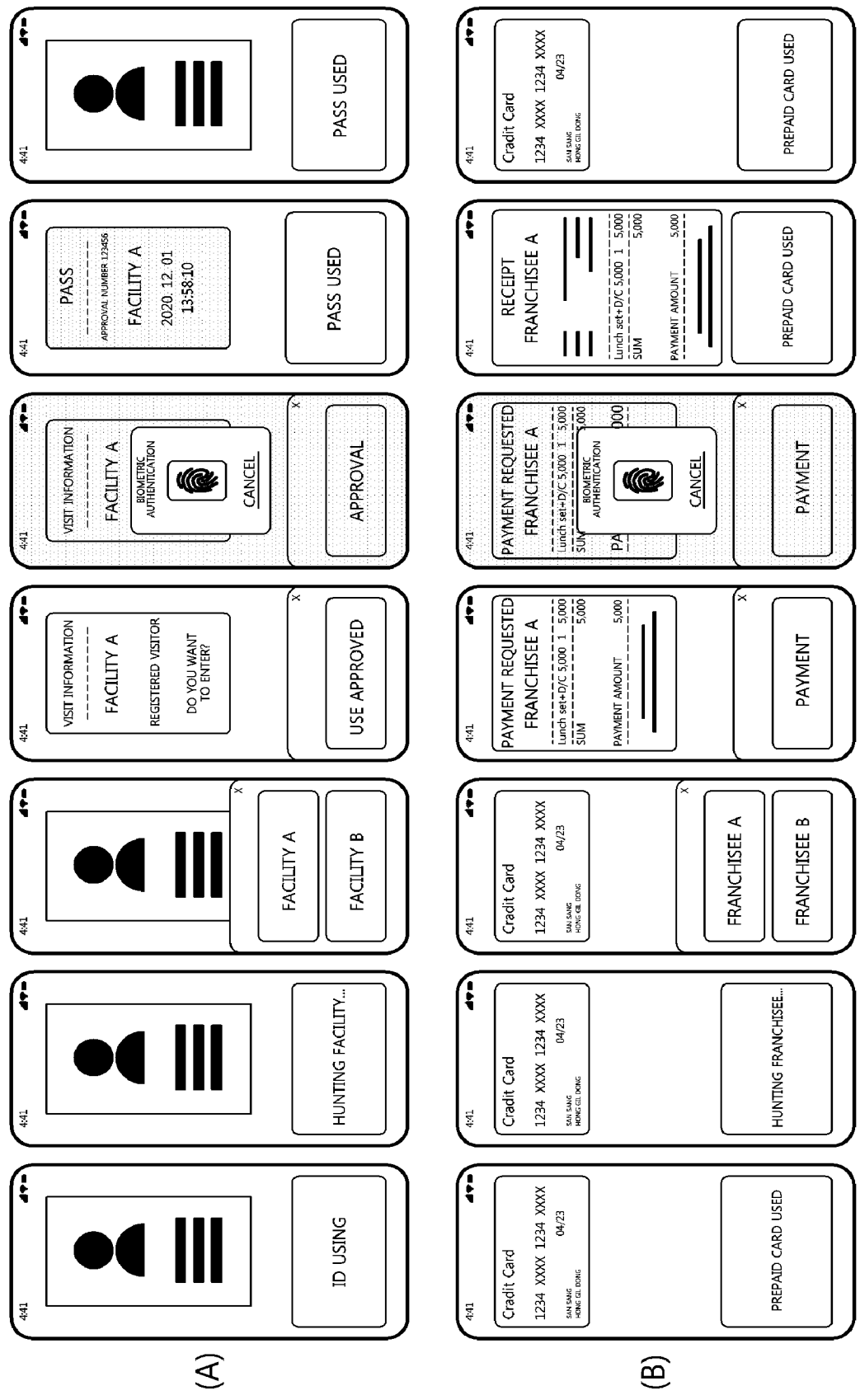
[FIG. 7]

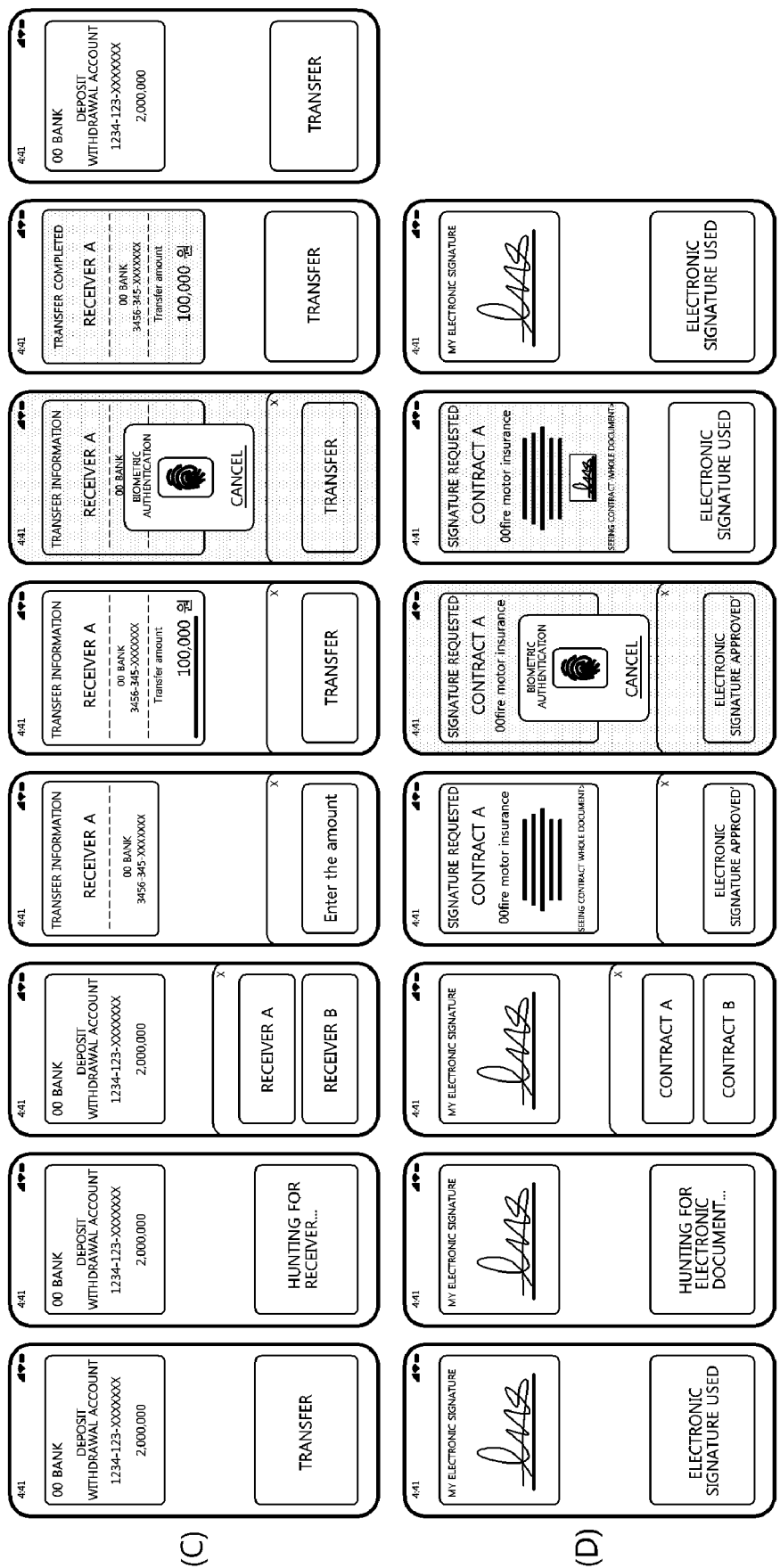
[FIG. 8]

SERVICE IDENTIFYING AND PROCESSING METHOD USING LOW DISTANCE WIRELESS TERMINAL MESSAGE

TECHNICAL FIELD

The present invention relates to a method identifying a service provided by a terminal device that has transmitted a relevant message using a wireless terminal message and processing the service therethrough.

BACKGROUND OF THE INVENTION

Recently, offline based application (App) services using mobile devices are developed and expanded at a rapid speed. In general, various information providing services using a QR (Quick Response) code have been widely generated, which are realized by a method where a QR code is mounted therein with a URL (Uniform Resource Locator) and other pieces of information, relevant information of which is then directly inquired by a user who has scanned the same, or accessed (moved) to a stored URL, or the relevant information can be ascertained.

However, the QR code has disadvantages in that security is poor because authenticity cannot be checked before scanning whether it was personally disclosed by an offline service provider and the QR code is also somewhat burdensome in terms of usability because it requires, by a user, scanning operations using a camera. As a result, a method is required in which a system service-providable on offline can be safely ascertained and manipulated without recourse to a process of allowing a user to scan a QR code using a smartphone and the like.

One of the conventional techniques replaceable of a QR code is a BLE (Bluetooth Low Energy) beacon technology but it suffers from disadvantage or difficulty in that universality and compatibility cannot be explosively expanded as the QR code because of limited manipulation to a mobile application that provides a relevant beacon service.

Therefore, a measure is required from the BLE beacon technology that can enhance the universality and compatibility like the QR code in terms of several mobile payment services, mobile-based access/attendance management services, interlinked services with various IoT devices, mobile-based smart city services and the like.

DETAILED DESCRIPTION OF THE INVENTION

Technical Subject

The present invention is intended to provide an independent interface forming method configured to enable a terminal device that has transmitted a relevant message using a BLE based beacon message to perform a service manipulation along with information provision (supply) to a service prior to start of use of service from various mobile applications.

Technical Solution

In one general aspect of the present invention, there is provided a service identifying and processing method using a wireless terminal message, the method comprising: (a) receiving a wireless terminal message by a first entity which is a mobile device; and (b) expressing, by a first agent which is an information processing application program installed on the first entity, entity information of second entity based on the wireless terminal message and service confirmation information related to service provided by the second entity, through an application screen by the first agent.

Advantageous Effects

A service identifying and processing method using a wireless terminal message according to an exemplary embodiment of the present invention has an advantageous effect in that information concerning a relevant service and an execution screen can be quickly provided to a customer (user) side in compliance with type of service provided by a relevant terminal device before certification on authenticity of terminal device that transmits a short-range wireless terminal message including a BLE beacon message and the like can be checked.

Furthermore, a service identifying and processing method using a wireless terminal message according to an exemplary embodiment of the present invention has an advantageous effect in that an independent interface can be formed configured to enable a terminal device that has transmitted a relevant message using a BLE based beacon message to perform a service manipulation along with information provision to a service prior to start of use of service from various mobile applications.

BRIEF DESCRIPTIONS OF DRAWINGS

FIG. 1 is a process flow chart of a service identifying and processing method using a wireless terminal message according to a first exemplary embodiment of the present invention.

FIG. 2 is a process flow chart of a service identifying and processing method using a wireless terminal message according to a second exemplary embodiment of the present invention.

FIG. 3 is a process flow chart of a service identifying and processing method using a wireless terminal message according to a third exemplary embodiment of the present invention.

FIG. 4 is a process flow chart of a service identifying and processing method using a wireless terminal message according to a fourth exemplary embodiment of the present invention.

FIGS. 5-8 respectively show exemplary screens in which an information screen matching to a relevant service type is expressed on an application screen of a mobile device at a customer (user) side based on an identified service according to a service identifying and processing method using a wireless terminal message of the present invention.

BEST MODE

The invention described hereunder may be applied with various changes and several exemplary embodiments, and particular exemplary embodiments will be described in detail through exemplary drawings and detailed descriptions.

However, it should be noted that the present invention is not limited to particular exemplary embodiments, and it will be appreciated that the present invention described is intended to embrace all such alterations, modifications, and variations that fall within the scope and novel idea of the present invention. In describing the present invention, detailed descriptions of well-known art in the art may be omitted to avoid obscuring appreciation of the invention with unnecessary details.

Numerals (e.g., first, second, etc.) used in the process of explaining the present specification are merely identifying numerals to distinguish one element from another element.

Furthermore, throughout the specification, it will be understood that when an element is referred to as being "connected", "coupled" or "accessed" to another element, it can be directly connected, coupled or accessed to the other element or intervening elements may be present unless explicitly described to the contrary.

In addition, throughout the specification, when an element "includes" another element, this does not mean that another element is precluded but may further include another element unless explicitly described to the contrary.

Still furthermore, throughout the specification, it will be understood that, in order for an element to perform a "process" for accomplishing a particular purpose, unless using a "direct processing" or a "direct implementing", "processing" or "implementing" is implied to include the "processing" or "implementing" through other interlinked elements.

In addition, the terms "-er", "-or", "part" and/or "module" described in the specification mean units for processing at least one function and operation and can be implemented by hardware components or software components and combinations thereof.

Now, exemplary embodiments of the present invention will be described in detail with reference to the accompanying drawings.

FIG. 1 is a process flow chart of a service identifying and processing method using a wireless terminal message according to a first exemplary embodiment of the present invention, FIG. 2 is a process flow chart of a service identifying and processing method using a wireless terminal message according to a second exemplary embodiment of the present invention, FIG. 3 is a process flow chart of a service identifying and processing method using a wireless terminal message according to a third exemplary embodiment of the present invention, and FIG. 4 is a process flow chart of a service identifying and processing method using a wireless terminal message according to a fourth exemplary embodiment of the present invention.

Furthermore, FIGS. 5-8 respectively show exemplary screens in which an information screen matching to a relevant service type is expressed on an application screen of a mobile device at a customer (user) side based on an identified service according to a service identifying and processing method using a wireless terminal message of the present invention.

A service identifying and processing method using a wireless terminal message according to an exemplary embodiment of the present invention may be realized by including (a) receiving a wireless terminal message by a first entity, and (b) expressing, by a first agent which is an information processing application program installed on the first entity, entity information of second entity based on the wireless terminal message and service confirmation information related to service provided by the second entity, through an application screen by the first agent.

Here, the first entity refers to a mobile device of a user, the first agent refers to a mobile agent (100) of FIGS. 1-4 as an application program that performs information process related to the present invention by being installed on the mobile device of the user, and the second entity refers to a subject that transmits a wireless terminal message to correspond to a BLE broadcast terminal (50, hereinafter simply referred to as a 'BLE terminal 50') of FIGS. 1-4.

The wireless terminal message in the present invention is not particularly limited, but, hereinafter, for convenience of explanation and concentration, explanation will be centered on a case where a BLE (Bluetooth Low Energy) beacon message is used as a wireless terminal message, as illustrated in FIGS. 1-4.

Furthermore, the BLE terminal (50) in the specification may be an independent device including a BLE beacon transmission module for transmitting a BLE beacon message, and may be realized in a shape that is driven as an application in a mobile device such as a smartphone or the like. However, the present invention is not particularly limited in terms of realizing method.

In addition, although the BLE terminal (50) may promptly correspond to the said second entity, the BLE terminal (50) may be a device separate from the second entity, albeit being interlinked to the service provision (supply) of the second entity, depending on configuration of a device.

For example, a case where a store POS (Point-Of-Sale) device itself is mounted with a BLE beacon transmission module, or a case where a door control terminal itself is mounted with a BLE beacon transmission module may correspond to the former case explained above.

On the other hand, a BLE beacon transmitter (corresponding to the BLE terminal 50), installed adjacent to a store POS device (corresponding to the second entity) which is a terminal for payment processing service, or adjacent to a door control terminal (corresponding to the second entity) which is a terminal for access service, may correspond to the latter case explained above as a physically independent device formed to be mutually and functionally interlinked for corresponding service processes.

However, hereinafter, an explanation will be centered on a case where the BLE terminal (50) is just a second entity for convenience of explanation and concentration.

Explanation of FIG. 1—First Exemplary Embodiment

Referring to FIG. 1, a mobile agent (100) may receive a BLE beacon message broadcast by a BLE terminal (50) {See reference numeral (1) in FIG. 1}.

At this time, the BLE beacon message broadcast by the BLE terminal (50) may include terminal identifying information and terminal authentication information. Here, although the terminal identifying information uses various identification values without any particularly restrictions, it is assumed that Beacon IDs expressed in predetermined serial numbers are used in the exemplary embodiment of the present invention. It should be apparent that various authentication values may be used without any particular restrictions under the similar purport thereof.

Successively, a mobile agent (100) may transmit the terminal identifying information and terminal authentication information to an open terminal server (200) as a BLE data {See reference numeral (2) in FIG. 1}.

The open terminal server (200) in the present invention may correspond or be equivalent to a subject that performs the role of an authentication processing server that performs the authentication on authenticity of the BLE terminal (50) and that also processes the service provided through the BLE terminal (50, i.e., second entity). However, it should be apparent that, depending on a system realization method, a server for authentication processing and a server for service processing may be performed as separate independent devices but may be so formed as to be mutually interlinked.

As a result, the open terminal server (200) may perform the authentication on the authenticity of the BLE terminal (50) (i.e., whether it is a counterpart, that actually provides the relevant service) through verification of the terminal authentication information received from the mobile agent (100 and transmit a relevant authentication result to the mobile agent (50).

According to the conventional technology, only authentication on authenticity of a user side (user authentication or identification) was required and no authentication on authenticity of counterpart side was performed, whereby a loophole existed on the transaction safety or service processing safety.

On the other hand, the present invention employs a method that solves a problem of delay in processing the service speed that may be generated by being added with an authentication process on the part of the counterpart while allowing realizing a safe transaction and service process by performing a mutual authentication on a user side and a counterpart side, whereby, prior to execution of transmission of authentication performance on the counterpart side (i.e., BLE terminal 50) or of the authentication result, mobile screen expression of the user side of the terminal information of the BLE terminal (50) (i.e., entity information of the counterpart entity) and of the service confirmation information is made to be executed in advance.

To this end, when the open terminal server (200) receives terminal identifying information from the mobile agent (100), the open terminal server (200) may obtain terminal information (i.e., entity information) based on the received terminal identifying information, and also obtains terminal type information (or service type information) related thereto and may transmit the same to the mobile agent (100) {See reference numeral (3) in FIG. 1}.

As a result, the mobile agent (100) may express the terminal information received from the open terminal server (200) through an application screen, and also extract service confirmation information corresponding to the terminal type information (or the service type information) received from the open terminal server (200), and express the extracted service confirmation information through the application screen {See reference numeral (4) in FIG. 1}.

When the service confirmation information is expressed through the application screen as explained above, a user may select a service he or she requires based on the screen-expressed service confirmation information {See reference numeral (5) in FIG. 1}, and the mobile agent (100) may request with the open terminal server (200) the process regarding the service selected by the user {See reference numeral (6) in FIG. 1}, whereby the open terminal server (200) may execute the service process resultant from the relevant request and may transmit the service process result to the mobile agent (100) and the BLE terminal (50) {See reference numerals (7) and (8) in FIG. 1}.

At this time, because it is sufficient to process the authentication on the aforementioned BLE terminal (50) before the service process requested by the user side is actually executed, the problem of delay in service process speed that might be generated by addition of authentication process of the BLE terminal (50) can be solved.

Explanation of FIG. 2—Second Exemplary Embodiment

A case of FIG. 2 may be also identical in some processes to that of FIG. 1 explained before {See reference numerals (3) (5) and (6) in FIG. 2}.

According to the case of FIG. 2, the BLE beacon message broadcast by the BLE terminal (50) may include the terminal type (or service type) information {See reference numeral (1) in FIG. 2}.

As a result, the mobile agent (100) may obtain terminal type (or service type) information included in the BLE beacon message, extract service confirmation information corresponding to the obtained terminal type (or service type) information and may express the extracted service confirmation information through the screen {See reference numeral (2) in FIG. 2}. Toward this end, the mobile agent (100) may store in advance the service confirmation information corresponding to each of the terminal type (or service type).

Furthermore, according to the case of FIG. 2, the authentication information for authenticity of the BLE terminal (50) can be transmitted together when there is a request for particular service process provided by the BLE terminal (50) {See reference numeral (4) in FIG. 2}.

Explanation of FIG. 3—Third Exemplary Embodiment

FIG. 3 illustrates a case where an inquiry of BLE terminal (50) is performed through interlink with BNS (BLE Name Server, 300) in the process of obtaining terminal information (i.e., entity information) on the BLE terminal (50) and service confirmation information.

Particularly, although FIG. 3 illustrates a case where the mobile agent (100) directly interlinks with the BNS (300), the BNS (300) may operate in a method that is interlinked with the open terminal server (200) (or at least one of the service process server and authentication process server) as explained in FIGS. 1 and 2. However, explanation will be centered on a case where the BNS (300) is directly interlinked with the mobile agent (100) for convenience of explanation and concentration.

According to FIG. 3, the mobile agent (100) may extract terminal identifying information (See Terminal ID of FIG. 3) from a BLE beacon message broadcast by the BLE terminal (50) {See reference numerals (1) and (2) in FIG. 3}, request an inquiry (i.e. inquiry of entity information and service confirmation information) on the terminal information with the BNS (300) by transmitting the extracted terminal identifying information to the BNS (300) {See reference numeral (3) in FIG. 3}, and when the terminal information (i.e., terminal Meta information as entity information (See Metadata of FIG. 3) and the service confirmation information (See Return URL and type information of FIG. 3) are received from the BNS (300) {See reference numeral (4) in FIG. 3}, the received entity information and the service confirmation information may be expressed through the mobile application screen of the user side {See reference numeral (5) in FIG. 3}.

At this time, the terminal Meta information refers to entity information of serial number typed terminal identifying information (e.g., beacon ID) transformed to user directly recognizable and identifiable type of information. For example, OOO coffee house and OOO Internet café in FIG. 5, living room TV, main room lighting, library speaker, living room air conditioner in FIG. 6, facilities A and B in FIG. 7 (A), franchisees A and B in FIG. 7 (B), receivers A and B in FIG. 8 (A), and contracts A and B in FIG. 8 (B) are the very examples of terminal Meta information.

According to the aforementioned explanation, the terminal identifying information is information shaped of a serial number type, and the typed information that cannot be discerned, identified and recognized by a user, whereas the terminal Meta information is entity information of user recognizable and identifiable type by being interlinked with a counterpart entity on offline, such that even if certification process is omitted on the authentication process server regarding the abovementioned counterpart entity, an effect of a user's discriminating the authenticity on the counterpart entity can be also accomplished by itself.

Toward this end, the BNS (300) may be formed with a database that stores the terminal Meta information by being interlinked with the terminal identifying information.

Explanation of FIG. 4—Fourth Exemplary Embodiment

A case of FIG. 4 is substantially the same in terms of overall processes as that of FIG. 3 explained before. However, the case of FIG. 4 utilizes a data key instead of the terminal identifying information used in FIG. 3.

That is, the case of FIG. 4 employs a method in such a manner that the BNS (300) stores data on the BLE terminal (50), and allocates a data key (the data key may be a temporary key value) for extracting the data {See reference numerals (1) and (2) in FIG. 4}, and the BLE terminal (50) broadcasts the BLE beacon message including the data key {See reference numeral (3) in FIG. 4}, whereby the mobile agent (100) requests the inquiry of the information (i.e., entity information and service confirmation information) on a relevant terminal with the BNS (300) using the data key included in the BLE beacon message, and receives the information thereon {See reference numerals (4), (5) and (6) in FIG. 4}.

[Exemplary Explanation of Screens of FIGS. 5a~6b]

FIGS. 5a~6b illustrate examples where a plurality of entity information and service confirmation information of selected entity (or for each entity) are expressed on application screens, as a plurality of BLE beacon signals having a pre-designated signal strength or above is received.

The terminal Meta information as entity information expressed through an application screen of mobile agent (100) has already been explained in the prior explanation, such that service confirmation information expressed through the application screen will be explained hereinafter.

The mobile agent (100) may express, as the service confirmation information, and through the application screen, service configuration information {e.g., See the fourth screen example in FIG. 5a (A)} provided by the identified entity, service explanation information {e.g., See the fourth screen example in FIG. 5a (B)}, service function execution information {e.g., See the fourth screen example in FIG. 5b (B), or See the second screen example in FIG. 6 (D)} and the like.

For example, referring to FIG. 6, in allowing the mobile agent (100) to realize a service corresponding to the terminal type or service type, a power button, a channel button, and a sound control button may be arranged when the type is a TV type as the service function execution information, and only ON/OFF button may be derived in case of illumination type. Furthermore, albeit not clearly illustrated through the drawings, a floor selection button such as a first floor, a second floor and the like may be arranged in case of the type being of an elevator type. In addition, referring to FIG. 7, in case of the type being of a payment terminal type, a credit card which is a payment means may be expressed on an application screen, and at the same time, only the payment button may be derived as a service function execution information, and in case of the type being of a door terminal type, only an ID presentation button may be activated as service function execution information.

Furthermore, the mobile agent (100) may extract a user's service process object information required for processing the service identified in relation to a relevant entity by matching to the relevant service type, and may at the same time express, through the application screen, the service confirmation information and the user's service process object information.

Here, the user's service process object information may correspond to (or include) the ID information required by a user side for processing access service as in FIG. 7 (A), credit card information to be used by a user side for processing the payment service as in FIG. 7 (B), deposit and withdrawal account information to be used by a user side for processing the deposit and withdrawal service as in FIG. 8 (C), and user's electronic signature image information to be used for processing the contract electronic signature service as in FIG. 8 (D).

At this time, conversely, the mobile agent (100) may confirm a service type supportable by the user's service process object information and a relevant object, and may express, through the application screen, only the service confirmation information corresponding to the service type among the received wireless terminal messages.

According to the foregoing explanation, there is an advantageous effect in that the mobile agent, even before the actual start (process) of service use provided by the counterpart entity (the BLE terminal 50 in the present exemplary embodiment), may provide information to the relevant service based on the obtained terminal type or service type information through the application screen of the user mobile device and may configure at the same time an independent interface (GUI) to allow enabling a service manipulation.

Furthermore, according to an exemplary embodiment, only after manipulation of service through the service confirmation information expressed by the application screen is selected, the mobile agent (100) then may transmit, to the open terminal server (200), the terminal identifying information, the terminal authentication information, the user identifying information, the user authentication information, and information on the selected service manipulation, whereby the service process can be realized based on the service manipulation information selected through the mutual authentication on the BLE terminal (50) and the user authentication.

Although the present invention has been described in terms of exemplary embodiments, the present invention is not limited thereto. It should be easily appreciated that variations and changes may be variably made in the embodiments described by persons skilled in the art without departing from the teachings and scope of the present invention as defined by the claims.

The invention claimed is:

1. A service identifying and processing method using a wireless terminal message and comprising an authentication process server, the method comprising:
   (a) receiving a wireless terminal message by a first entity which is a mobile device, wherein the wireless terminal message includes a terminal identifying information and a terminal authentication information;
   (b) expressing offline, by a first agent which is an information processing application program installed on the first entity, entity information of a second entity based on the wireless terminal message and service confirmation information related to service provided by the second entity, through an application screen by the first agent, prior to start of use by the first entity of the service provided by the second entity; and (c) receiving, by the authentication process server, the terminal identifying information and terminal authentication information from the first agent, performing the authentication on the second entity through verification of the terminal authentication information, and transmitting the authentication result to the first agent.

2. The method of claim 1, wherein the first agent in the above (b) step forms, as an independent interface, the service confirmation information enabling to manipulate a relevant service along with information on the relevant service, based on information obtained in relation to the wireless terminal message prior to actual start of service use provided by the second entity, and expresses the same through the application screen.

3. The method of claim 2, further comprising a service process server, wherein:

the wireless terminal message includes the terminal identifying information and the terminal authentication information; and when service manipulation is selected through the service confirmation information at the above step (b), the first agent transmits, to the service process server, the terminal identifying information, the terminal authentication information, and information on the selected service manipulation to thereby allow realizing the service process based on the service manipulation information selected through the authentication of the second entity.

4. The method of claim 1, wherein screen expression of entity information and service confirmation information based on the (b) step is executed in advance prior to execution of transmission of authentication performance or the authentication result based on the (c) step.

5. The method of claim 1, wherein the first agent in the above step (b) transmits the terminal identifying information included in the wireless terminal message to an open terminal server comprising at least one of a service process server or the authentication process server, extracts the service confirmation information corresponding to terminal type information or service type information when the terminal type information or the service type information is received from the open server, and expresses the extracted service confirmation information through the screen.

6. The method of claim 1, wherein the first agent in the above step (b) obtains terminal type information or service type information included in the wireless terminal message, extracts the service confirmation information corresponding to the obtained terminal type information or the service type information, and expresses the extracted service confirmation information through the screen.

7. The method of claim 1, wherein the first agent includes a BNS (BLE Name Server) interlinked by communication with at least one of a service process server and the authentication process server, wherein the first agent in the above step (b) obtains terminal identifying information or data key information included in the wireless terminal message, and requests an inquiry of the entity information and the service confirmation information with the BNS by allowing the obtained terminal identifying information or the data key information to be transmitted to the BNS, and expresses the confirmed entity information and the service confirmation information through the screen.

8. The method of claim 7, wherein the BNS stores terminal Meta information by being interlinked with the terminal identifying information, and wherein the terminal Meta information includes entity information that is transformed to information in which the terminal identifying information is directly recognized and identified by a user.

9. The method of claim 1, wherein the first agent in the above (b) step expresses, as the service confirmation information, through the application screen, at least one of the service configuration information provided by an identified entity, service explanation information and service function execution information, or express, through the application screen, the service confirmation information and a user's service process object information together by extracting the user's service process object information required for processing a service identified from the relation with a relevant entity.

10. The method of claim 9, wherein the first agent in the above (b) step confirms a supportable service type based on the service process object information, and express, through the application screen, only the service confirmation information corresponding to a confirmed service type among received wireless terminal messages.

* * * * *